United States Patent
Ichioka

(10) Patent No.: US 10,845,788 B2
(45) Date of Patent: Nov. 24, 2020

(54) CONTROL SYSTEM AND CONTROL UNIT

(71) Applicant: Mitsubishi Electric Corporation, Chiyoda-ku (JP)

(72) Inventor: Ryoya Ichioka, Tokyo (JP)

(73) Assignee: Mitsubishi Electric Corporatioon, Chiyoda (JP)

( * ) Notice: Subject to any disclaimer, the term of this patent is extended or adjusted under 35 U.S.C. 154(b) by 30 days.

(21) Appl. No.: 16/068,273

(22) PCT Filed: Feb. 3, 2016

(86) PCT No.: PCT/JP2016/053274
§ 371 (c)(1),
(2) Date: Jul. 5, 2018

(87) PCT Pub. No.: WO2017/134783
PCT Pub. Date: Aug. 10, 2017

(65) Prior Publication Data
US 2019/0025804 A1    Jan. 24, 2019

(51) Int. Cl.
*G06F 11/20* (2006.01)
*G05B 19/418* (2006.01)
(Continued)

(52) U.S. Cl.
CPC .... *G05B 19/41855* (2013.01); *G06F 11/2033* (2013.01); *G06F 11/2038* (2013.01);
(Continued)

(58) Field of Classification Search
CPC .............................. G06F 11/20; G06F 11/2033
(Continued)

(56) References Cited

U.S. PATENT DOCUMENTS 6,396,806 B1    5/2002    Horita
2003/0191848 A1*  10/2003  Hesselink ........... H04L 63/0218
                                                 709/229
(Continued)

FOREIGN PATENT DOCUMENTS

JP    03-63802 A    3/1991
JP    07-134601 A   5/1995
(Continued)

OTHER PUBLICATIONS

Office Action dated Nov. 29, 2017 in Japanese patent application No. 2017-558769A (with partial English translation), 5 pages.
(Continued)

*Primary Examiner* — Kamini B Patel
(74) *Attorney, Agent, or Firm* — Oblon, McClelland, Maier & Neustadt, L.L.P.

(57) ABSTRACT

A control system includes one control unit connected to input/output units connected to an apparatus and another control unit capable of substituting for the one control unit. In the control system, the one control unit establishes connection to the input/output units. The control system includes a determination layer and a secure communication layer. The determination layer determines to establish connection between the other control unit and the input/output units when the connection between the one control unit and the input/output units is broken. The secure communication layer establishes connection between the other control unit and the input/output units in accordance with a result of the determination by the determination layer.

5 Claims, 12 Drawing Sheets

(51) Int. Cl.
*H04L 12/24* (2006.01)
*H04L 29/14* (2006.01)
*H04L 29/08* (2006.01)

(52) U.S. Cl.
CPC ...... *G06F 11/2043* (2013.01); *H04L 41/0654* (2013.01); *H04L 41/0663* (2013.01); *H04L 41/0695* (2013.01); *H04L 69/40* (2013.01); *G05B 2219/31368* (2013.01); *H04L 67/12* (2013.01); *H04L 69/321* (2013.01)

(58) Field of Classification Search
USPC .......................................................... 714/10
See application file for complete search history.

(56) References Cited

U.S. PATENT DOCUMENTS

2010/0042737 A1* 2/2010 Fujimoto ........... H04N 1/00214
709/230

2011/0314506 A1* 12/2011 Agarwal ............... H04L 1/1607
725/62
2016/0224443 A1* 8/2016 Kuba .................. G06F 11/2033

FOREIGN PATENT DOCUMENTS

| JP | 10-313348 A | 11/1998 |
| JP | 11-98161 A | 4/1999 |
| JP | 2014-75105 A | 4/2014 |
| WO | WO 2015/045062 A1 | 4/2015 |

OTHER PUBLICATIONS

International Search Report dated Apr. 12, 2016 in PCT/JP2016/053274, filed on Feb. 3, 2016.
Combined Chinese Office Action and Search Report dated Jun. 19, 2020 in Chinese Patent Application No. 201680080471.5 (with unedited computer generated English translation and English translation of Category of Cited Documents), 18 pages.

* cited by examiner

CONTROL SYSTEM AND CONTROL UNIT

FIELD

The present invention relates to a control system and a control unit that control a facility in a process automation (PA) field or a factory automation (FA) field.

BACKGROUND

In general, the facility in the PA field or the FA field is achieved by combining a plurality of devices. Some devices configuring the facility in the PA field or the FA field are controlled by a duplex control system including a first control unit and a second control unit capable of substituting for the first control unit (see Patent Literature 1).

CITATION LIST

Patent Literature

Patent Literature 1: Japanese Patent Application Laid-Open No. H10-313348

SUMMARY

Technical Problem

The duplex control system disclosed in Patent Literature 1 applies secure communication between one of the first control unit and the second control unit and input/output units connected to the devices. The secure communication is communication for errorlessly transmitting a received signal or a signal that is to be transmitted. A reception side detects whether the received signal or the signal that is to be transmitted is broken. The existing secure communication used in the duplex control system employs various communication control schemes.

Through the secure communication, the duplex control system transmits and receives information between one of the first and second control units and the input/output units. The duplex control system establishes connection between one of the first and second control units and the input/output units before the transmission and reception of the information between the one of the first and second control units and the input/output units. To switch a state in which the information is transmitted and received between the one of the first and second control units and the input/output units to a state in which the information is transmitted and received through the secure communication between the other control unit and the input/output units, the duplex control system needs to disconnect the one control unit from the input and output units and establish connection between the other control unit and the input and output units. The duplex control system is required to switch the connection even where the duplex control system uses the secure communication employing the various communication control schemes.

The present invention has been devised in view of the above, and an object of the present invention is to obtain a control system that can switch connection of secure communication.

Solution to Problem

To solve the problems described above and achieve the object, the present invention provides a control system including a first control unit connected to an input/output unit connected to a device and a second control unit capable of substituting for the first control unit. The control system allows one control unit of the first control unit and the second control unit to establish connection to the input/output unit. The control system includes determining means for determining to establish connection between the other control unit of the first control unit and the second control unit and the input/output unit when the connection between the one control unit and the input/output unit is broken. The control system includes connecting means for establishing the connection between the other control unit and the input/output unit in accordance with a result of the determination by the determining means.

Advantageous Effects of Invention

The control system according to the present invention achieves an effect of switching the connection of secure communication.

DESCRIPTION OF EMBODIMENTS

Control systems and control devices according to embodiments of the present invention are explained in detail below with reference to the drawings. Note that the present invention is not limited by the embodiments.

First Embodiment

Figure 1:
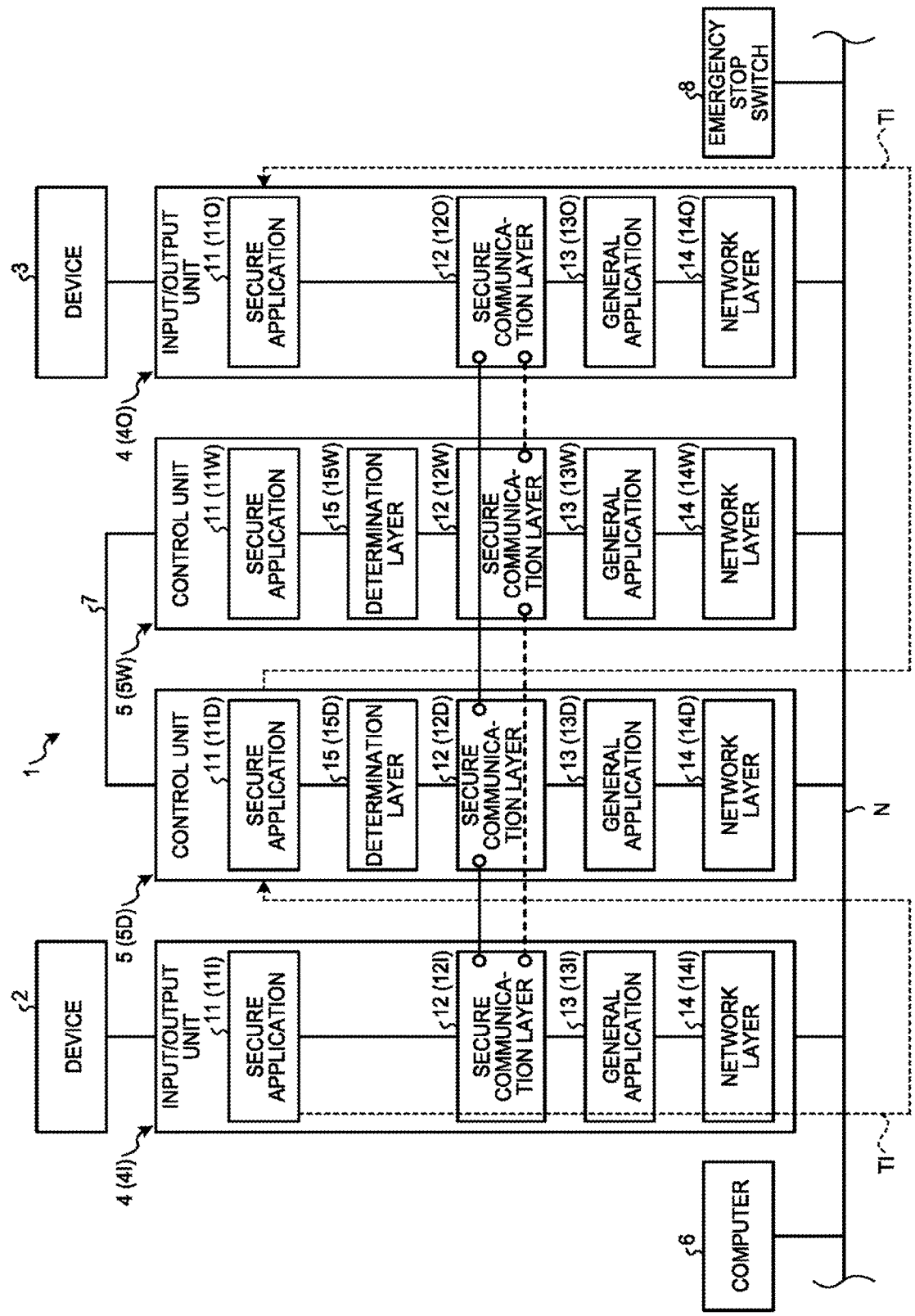
FIG. 1 is a diagram illustrating the configuration of a control system according to a first embodiment.

FIG. 1 is a diagram illustrating the configuration of a control system according to a first embodiment. A control system 1 configures a facility in a PA field or an FA field and controls a plurality of devices 2 and 3 illustrated in FIG. 1 set in the facility. In the first embodiment, the devices 2 and 3 are sensors or driving devices. The sensor is, for example, a sensor set in the facility for that detecting a flow rate, pressure, concentration, or temperature. The driving device is, for example, a driving device set in the facility that executes operation, such as a switch, a regulator valve, an electromagnetic valve, or a motor. In the first embodiment, the control system 1 includes the two devices 2 and 3. However, the devices of the control system 1 are not limited to the two devices. In the first embodiment, the device 2 is a sensor and the device 3 is a driving device.

The control system 1 includes, as illustrated in FIG. 1, a plurality of input and output units (hereinafter referred to "input/output units") 4 connected to the devices 2 and 3 and a plurality of control units 5 connected to the input/output units 4. The control units 5 receive a control program created by a computer 6 and execute the received control program to thereby control the devices 2 and 3 via the input/output units 4.

Figure 2:
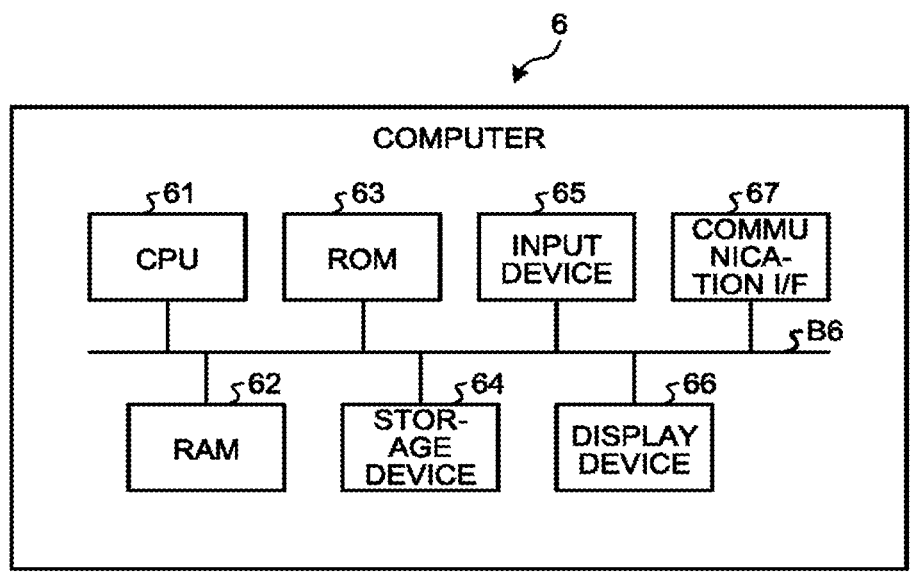
FIG. 2 is a diagram illustrating a hardware configuration of a computer of the control system according to the first embodiment.

FIG. 2 is a diagram illustrating a hardware configuration of the computer of the control system according to the first embodiment. The computer 6 according to the first embodiment executes a computer program. The computer 6 include, as illustrated in FIG. 2, a central processing unit (CPU) 61, a random access memory (RAM) 62, a read only memory (ROM) 63, a storage device 64, an input device 65, a display device 66, and a communication interface 67. The CPU 61, the RAM 62, the ROM 63, the storage device 64, the input device 65, the display device 66, and the communication interface 67 are connected to one another via an internal bus B6.

The CPU 61 executes programs stored in the ROM 63 and the storage device 64, using the RAM 62 as a work area. The program stored in the ROM 63 is a Basic Input/Output System (BIOS) or a Unified Extensible Firmware Interface (UEFI). However, the program stored in the ROM 63 is not limited to the BIOS or the UEFI. In the first embodiment, the programs stored in the storage device 64 are an operating system program and an engineering tool program. However, the programs stored in the storage device 64 are not limited to the operating system program and the engineering tool program. In the first embodiment, the storage device 64 is a solid state drive (SSD) or a hard disk drive (HDD). However, the storage device 64 is not limited to the SSD or the HDD.

The input device 65 receives an operation input from a user. In the first embodiment, the input device 65 is a keyboard or a mouse. However, the input device 65 is not limited to the keyboard or the mouse. The display device 66 displays characters and images. In the first embodiment, the display device 66 is a liquid crystal display device. However, the display device 66 is not limited to the liquid crystal display device. The communication interface 67 is connected to a network N and performs communication with the control units 5 via the network N. The network N is a computer network that communicably connects the computer 6, the input/output units 4, and the control units 5 to one another. In the first embodiment, the network N is a local area network (LAN) set in a PA facility of an FA facility. However, the network N can be a bus for communication.

The input/output units 4 are connected to the network N. In the first embodiment, two input/output units 4 are provided. However, the input/output units 4 are not limited to the two input/output units 4. The two input/output units 4 are respectively connected to the devices 2 and 3. In the first embodiment, each of the input/output units 4 is connected to a corresponding one of the device 2 and the device 3. However, the input/output units 4 are not limited to this. The one of the input/output units 4, which is connected to the device 2, i.e., a sensor, receives a result of detection by the device 2 and stores the received detection result. The other of the input/output units 4, which is connected to the device 3, i.e., the driving device, receives a control signal transmitted by the control unit 5 for controlling the device 3, and stores the received control signal. The input/output unit 4, which is connected to the device 3, i.e., the driving device, transmits the stored control signal to the device 3.

In the first embodiment, the one input/output unit 4 (hereinafter indicated by a reference sign 4I) of the two input/output units 4 operates as a so-called input unit connected to the device 2 that is the sensor. The other input/output unit 4 (hereinafter indicated by a reference sign 4O) operates as a so-called output unit connected to the device 3 that is the driving device. The description of the present application attaches two reference signs "4I" and "4O" to the two input/output units 4, respectively, where it is appropriate to distinguish these two input/output units 4 from each other for convenience of the explanation thereof. Where it is not necessary to distinguish the two input/output units 4 from each other for convenience of the explanation thereof, reference numeral "4" is attached to the two input/output units.

The control units 5 are connected to the network N. In the first embodiment, the two control units 5 are provided and connected to each other via the network N. The two control units 5 are connected to each other by a tracking cable 7 and the one of the two control units 5 makes the other redundant. The control units 5 act as CPU units of programmable logic controllers (PLCs) that control the devices 2 and 3 by executing the control program received from the computer 6. The programmable controllers are prescribed by the Japan Industrial Standard (JIS) B 3502:2011.

The two control units 5 are connected in a one-to-one correspondence to both of the two input/output units 4 via the network N. In the first embodiment, the one control unit 5 of the two control units 5 is a first control unit. The one control unit 5 acquires information including the detection result provided by the device 2, the information being stored in the input/output unit 4I. The first control unit transmits to the other input/output unit 4O information including the control signal for the device 3. The other of the two control units 5 is a second control unit. The other control unit 5 maintains a standby state while the one control unit 5 acquires the information concerning the device 2 and controls the operation of the device 3. In the first embodiment, the standby state is a so-called standby power supply mode for power saving. The standby state refers to a state of any one of S1, S2, S3, and S4 prescribed by the Advanced Configuration and Power Interface (ACPI) or a state equivalent to any one of S1, S2, S3, and S4 prescribed by the ACPI. The standby state is not limited to the standby power supply mode. The standby power supply mode is not limited to the state prescribed by the ACPI.

The one control unit 5 operates as a driving control unit that acquires the information concerning the devices 2 and 3 and controls the devices 2 and 3. The other control unit 5 operates as a standby control unit that maintains the standby state. In the first embodiment, when the driving control unit is powered off, when the driving control unit is reset to an initial state, when the driving control unit fails, when the driving control unit suspends or stops performing the processing, due to an error, or when the standby control unit receives from the computer 6 a signal indicating a switching request, the standby control unit is switched to the driving control unit. The standby control unit, which is now switched to the driving control unit, acquires the information concerning the device 2 and controls the operation of the device 3 in place of the control unit that has been so far operating as the driving control unit. That is, the standby control unit is capable of substituting for the driving control unit. Note that the control unit that has being operating as the driving control unit is switched to the standby control unit when the counterpart control unit restarts from the power-off state, after the counterpart control unit is reset, when the counterpart control unit is restored from the failure or the error, or when the counterpart control unit receives from the computer 6 a signal indicating a switching request. That is, the other control unit 5 operating as the standby control unit is capable of substituting for the one control unit 5 operating as the driving control unit.

In the first embodiment, where it is appropriate to distinguish the two control units 5 from each other, the one control unit 5 operating as the driving control unit is indicated by reference sign "5D", and the other control unit 5 operating as the standby control unit is indicated by reference sign "5W". Where it is not necessary to distinguish the driving control unit and the standby control unit from each other, these control units are simply indicated by reference numeral "5".

In the first embodiment, the two control units 5 have the same configuration. In the first embodiment, because the configurations of the two control units 5 and the two input/output units 4 are equivalent, the same elements are explained with the same reference numerals and signs attached thereto. Of the elements of the control units 5 and the input/output units 4 in the first embodiment, the elements that can be specified as elements of the one control unit 5D operating as the driving control unit are explained with sign "D" attached thereto. The elements that can be specified as elements of the other control unit 5W operating as the standby control unit are explained with sign "W" attached thereto. The elements that can be specified as elements of the input/output unit 4I are explained with sign "I" attached thereto. The elements that can be specified as elements of the input/output unit 4O are explained with sign "O" attached thereto. Of the elements of the control units 5 and the input/output units 4 in the first embodiment, further, the elements that cannot be specified are explained without sign "D", the sign "W", the sign "I", and the sign "O" being attached thereto.

The control units 5 and the input/output units 4 include, as illustrated in FIG. 1, secure application software (hereinafter simply described as secure applications) 11 for stopping at least one input/output unit 4 when an emergency stop switch 8 set in the facility is operated. The control units 5 and the input/output units 4 also include secure communication layers 12 that are connecting means that perform secure communication with units other than the own units. The control units 5 and the input/output units 4 further include general application software (hereinafter simply described as general applications) 13, and network layers 14. In the first embodiment, the emergency stop switch 8 is connected to the network N.

Figure 3:
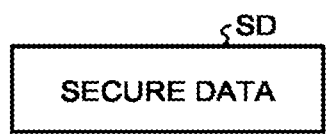
FIG. 3 is a diagram illustrating secure data generated by secure applications of the control system according to the first embodiment.

FIG. 3 is a diagram illustrating secure data generated by the secure applications of the control system according to the first embodiment. The secure application 11 generates secure data SD, illustrated in FIG. 3, that indicates whether to stop the devices 2 and 3 or the secure application 11 receives the secure data SD generated by the secure application 11 of the unit other than the own unit.

When receiving, via the network N, information indicating that the emergency stop switch 8 is operated, a secure application 11D of the one control unit 5D operating as the driving control unit extracts ones 2 and 3 of the devices 2 are 3 connected to the plural input/output units 4, which extracted devices 2 and 3 should be brought to emergency stop. The secure application 11D of the one control unit 5D operating as the driving control unit generates the secure data SD and transmits the generated secure data SD to the input/output units 4 connected to the extracted devices 2 and 3 that should be brought to the emergency stop. The generated secure data SD transmitted to the input/output units 4 causes such input/output units 4 to bring the extracted devices 2 and 3 to the emergency stop.

A secure application 11I of the input/output unit 4I determines whether the device 2 breaks down on the basis of the detection result provided by the device 2, i.e., the sensor, and generates the secure data SD that is information indicating whether the device 2 breaks down. The secure application 11D of the one control unit 5D operating as the driving control unit acquires, via the network N, the secure data SD generated by the secure application 11I of the input/output unit 4I.

When the secure data SD generated by the secure application 11I of the input/output unit 4I indicates that the device 2 is out of order, the secure application 11D of the one control unit 5D operating as the driving control unit extracts the ones 2 and 3 of the devices 2 and 3 connected to the plural input/output units 4, which extracted devices 2 and 3 should be brought to emergency stop. The secure application 11D of the one control unit 5D operating as the driving control unit generates the secure data SD and transmits the generated secure data SD to input/output units 4 connected to the extracted devices 2 and 3 that should be brought to the emergency. The generated secure data SD transmitted to the input/output units 4 causes such input/output units 4 to bring the extracted devices 2 and 3 to the emergency stop. When information indicating that the emergency stop switch 8 is operated is not received and the secure data SD generated by the secure application 11I of the input/output unit 4I indicates that the device 2 is normal, the secure application 11D of the one control unit 5D operating as the driving control unit generates the secure data SD indicating that the control system 1 is normal, and transmits the generated secure data SD to the input/output unit 4O.

On the basis of the secure data SD received from the one control unit 5D operating as the driving control unit, a secure application 11O of the input/output unit 4O determines whether to stop the device 3. When the secure data SD received from the control unit 5D is information for bringing the device 3 to the emergency stop, the secure application 11O brings the device 3 to the emergency stop. When the secure data SD received from the control unit 5D indicates that the control system 1 is normal, the secure application 11O of the input/output unit 4O causes the device 3 to continuously operate.

Figure 4:
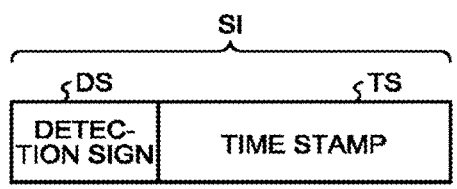
FIG. 4 is a diagram illustrating the configuration of information for secure communication generated by secure communication layers of the control system according to the first embodiment.
Figure 5:
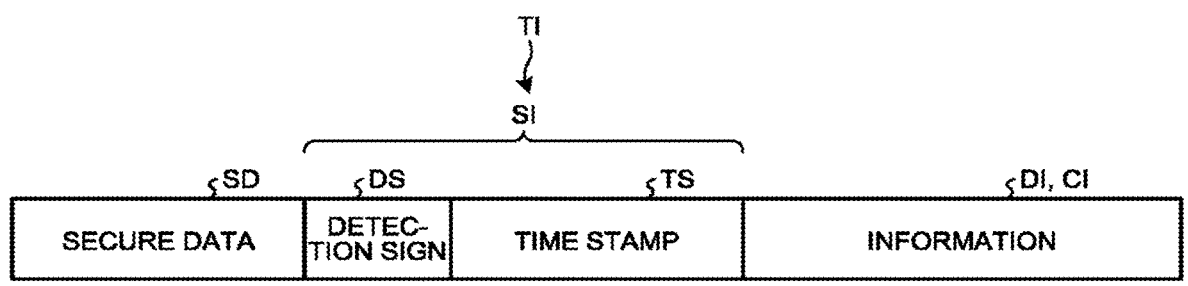
FIG. 5 is a diagram illustrating the configuration of communication information generated by the secure applications, the secure communication layers, and general applications of the control system according to the first embodiment.

FIG. 4 is a diagram illustrating the configuration of information for secure communication generated by the secure communication layers of the control system according to the first embodiment. FIG. 5 is a diagram illustrating the configuration of communication information generated by the secure applications, the secure communication layers, and the general applications of the control system according to the first embodiment. Secure communication performed by the secure communication layers 12 detects whether information transmitted and received between the one control unit 5D operating as the driving control unit and the input/output units 4I and 4O is transmitted and received without causing an accidental error.

In the first embodiment, the secure communication layers 12 generate information SI for secure communication illustrated in FIG. 4. The information SI for secure communication generated by the secure communication layers 12 includes, as illustrated in FIG. 4, a detection sign DS for detection of errors of the secure data SD, and a time stamp TS indicating a time when the detection sign DS is generated. The detection sign DS is a sign for detecting whether an accidental error occurs in the secure data SD. Of the control units 5 and the input/output units 4, the unit receiving the information detects, by virtue of the detection sign DS, whether an accidental error occurs in the secure data SD. In the first embodiment, Cyclic Redundancy Check (CRC) is used as the detection sign DS. However, the detection sign DS is not limited to the CRC. When detecting, on the basis of the received information SI for secure communication, that an accidental error does not occur in the secure data SD, the secure communication layers 12 cause the devices 2 and 3 to continuously operate. When detecting that an accidental error occurs in the secure data SD, the secure communication layers 12 bring the devices 2 and 3 to the emergency stop.

A general application 13I of the input/output unit 4I connected to the device 2, i.e., the sensor, acquires a result of detection provided by the device 2, i.e., the sensor, and generates information DI illustrated in FIG. 5. The information DI illustrated in FIG. 5 is information indicating the result of detection provided by the device 2. A general application 13D of the one control unit 5D operating as the driving control unit generates information CI illustrated in FIG. 5. The information CI illustrated in FIG. 5 is information indicating a control signal for the device 3, which is the driving device.

The control unit 5 and the input/output unit 4, which are configured as discussed above, communicate communication information TI to each other. As illustrated in FIG. 5, the communication information TI has the secure data SD, the information SI for secure communication, and the information DI and CI. The information SI for secure communication is disposed in a layer lower than the secure data SD, and the information DI and CI is disposed in a layer lower than the information SI for secure communication. In a communication protocol between the control unit 5 and the input/output units 4 of the control system, thus, the secure data SD generated by the secure application 11 is located in the layer higher than the information SI for secure communication generated by the secure communication layer 12. That is, in the communication protocol, the secure data SD generated by the secure application 11 is located in a different layer from the information SI for secure communication generated by the secure communication layer 12. In the first embodiment, the layers of the secure data SD, the information SI for secure communication, and the information DI and CI in the communication information TI illustrated in FIG. 5 are predetermined layers. Addresses in the layers of the secure data SD, the information SI for secure communication, and the information DI and CI in the communication information TI illustrated in FIG. 5 are predetermined addresses. Note that the layers of the communication protocol in this description collectively refer to layers in communication through which the control unit 5 and the input/output unit 4 transmit and receive information therebetween, and layers of processing executed in each control unit 5 and each input/output unit 4. The network layers 14 transmit and receive the communication information TI illustrated in FIG. 5.

In the control system 1 according to the first embodiment, the one control unit 5D operating as the driving control unit of the two control units 5 establishes connection to the input/output units 4 before transmitting and receiving the communication information TI. Establishing the connection means establishing a state in which the control unit 5 and the input/output units 4 connected by the network N to one another are capable of transmitting and receiving information to and from one another. That is, establishing the connection means providing lines for communication between the control unit 5 and the input/output units 4 via the network N.

The control unit 5 includes a determination layer 15 that is determining means for determining whether to establish the connection to the input/output units 4. In the communication protocol of the control system 1 and the control unit 5, the determination layer 15 is located in a higher layer than the secure communication layer 12. That is, in the communication protocol of the control system 1 and the control unit 5, the determination layer 15 is located in a different layer from the secure communication layer 12. A determination layer 15D of the one control unit 5D operating as the driving control unit of the two control units 5 determines to establish the connection to the input/output units 4. A secure communication layer 12D of the one control unit 5D operating as the driving control unit of the two control units 5 establishes the connection to the input/output units 4 in accordance with a result of the determination by the determination layer 15D.

When establishing the connection, the secure communication layer 12D of the one control unit 5D transmits and receives request information for establishment of secure communication and response information, to and from the secure communication layers 12 of the input/output units 4. The secure communication layer 12D of the one control unit 5D transmits and receives network-parameter-confirmation request information and response information, to and from the secure communication layers 12 of the input/output units 4, and stores and retains the parameters.

The secure communication layer 12D of the one control unit 5D transmits and receives secure-station-parameter-collation request information and response information, to and from the secure communication layers 12 of the input/output units 4 and confirms correctness of the parameters. The secure communication layer 12D of the one control unit 5D transmits and receives information concerning options and response information, to and from the secure communication layers 12 of the input/output units 4. The secure communication layer 12D of the one control unit 5D transmits and receives offset measurement information and response information, to and from the secure communication layers 12 of the input/output units 4. The secure communication layer 12D of the one control unit 5D transmits and receives offset-generation request information and response information, to and from the secure communication layers 12 of the input/output units 4.

The determination layer 15D of the one control unit 5D operating as the driving control unit of the two control units 5 determines to establish the connection before transmitting and receiving the communication information TI, to and from the input/output units 4. The secure communication layer 12D of the one control unit 5D operating as the driving control unit of the two control units 5 establishes the connection in accordance with a result of the determination by the determination layer 15D, before transmitting and receiving the communication information TI, to and from the input/output units 4.

After the one control unit 5D operating as the driving control unit of the two control units 5 establishes the connection to the input/output units 4, the input/output unit 4I generates and stores the communication information TI including the information DI illustrated in FIG. 5, upon receiving a not-illustrated synchronization signal from the outside. Upon receiving the synchronization signal, the one control unit 5D operating as the driving control unit acquires the communication information TI from the input/output unit 4I and stores the communication information TI.

Upon receiving the synchronization signal, the one control unit 5D operating as the driving control unit acquires the communication information TI from the input/output unit 4I, generates the communication information TI including the information CI illustrated in FIG. 5, and transmits the generated communication information TI to the input/output unit 4O. The input/output unit 4O stores the communication information TI including the information CI. In the first embodiment, the process phrased by the expression "the control unit 5D acquires the communication information TI including the information DI, from the input/output unit 4I and transmits the communication information TI including the information CI, to the input/output unit 4O" indicates that the control unit 5D transmits and receives the communication information TI to and from the input/output units 4I and 4O.

Of the two control units 5 in the control system 1, the one control unit 5D operating as the driving control unit and the other control unit 5W operating as the standby control unit transmit and receive a signal for value equalization and a signal for mutual monitoring, to and from each other via the tracking cable 7. The signal for value equalization enables the standby control unit to acquire the communication information TI from the input/output unit 4I without deficiency and excess and transmit the communication information TI to the input/output unit 4O when the standby control unit is switched to the driving control unit in place of that which has been operating as the driving control unit. The signal for mutual monitoring is a signal for the two control units to monitor each other to determine whether the control units are operating without causing a failure.

When the connection established between the one control unit 5D and the input/output units 9 is broken during the operation of the one control unit 5D as the driving control unit, a determination layer 15W of the other control unit 5W operating as the standby control unit of the two control units 5 determines to establish connection to the input/output units 4. A secure communication layer 12W of the other control unit 5W operating as the standby control unit of the two control units 5 establishes connection of the other control unit 5W to the input/output units 4 in accordance with a result of the determination by the determination layer 15. In the other control unit 5W operating as the standby control unit, the secure communication layer 12W establishes the connection as with the one control unit 5D. After the secure communication layer 12W establishes the connection, the other control unit 5W transmits and receives the communication information TI to and from the input/output units 4, after which the other control unit 5W operates as the driving control unit.

Figure 6:
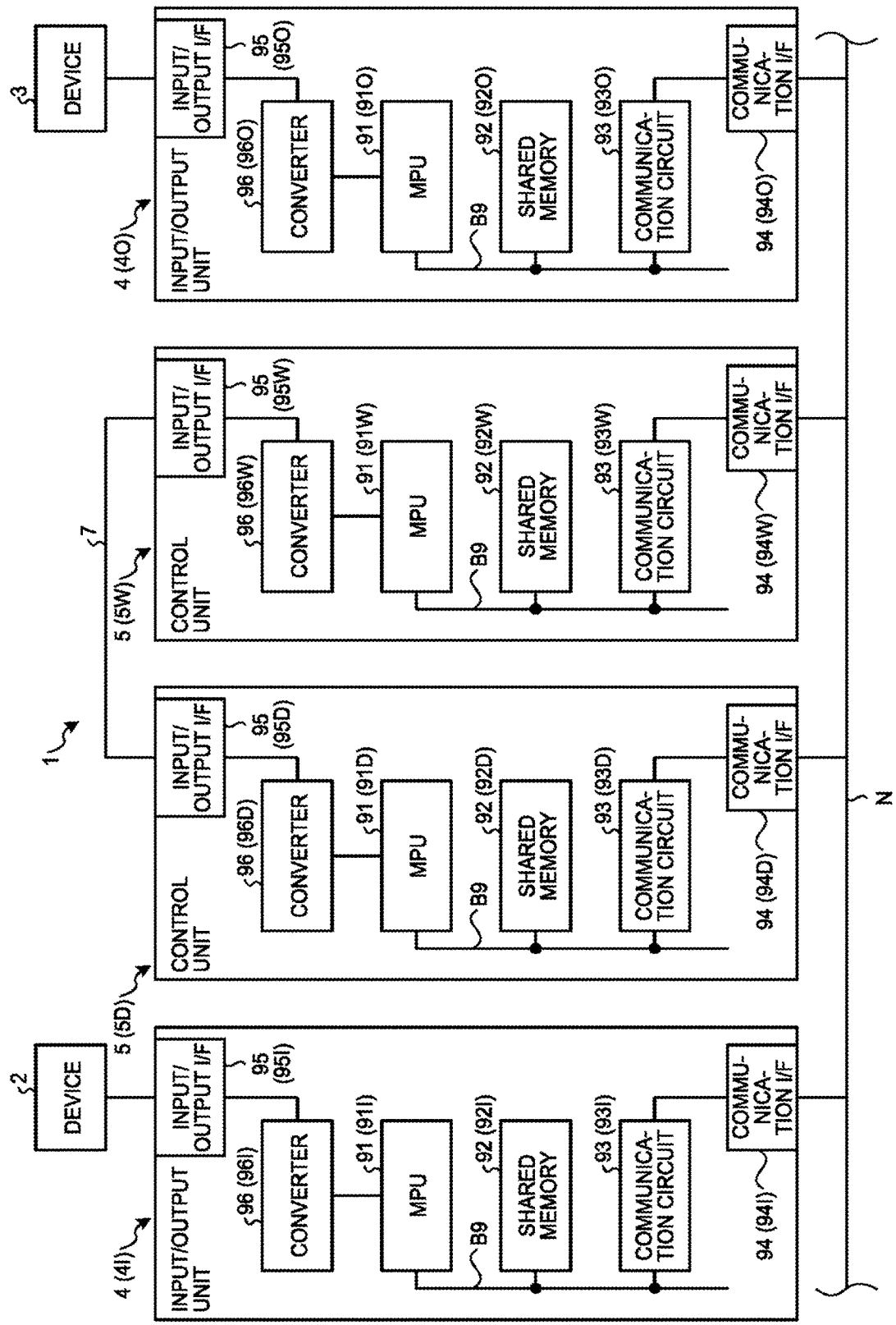
FIG. 6 is a diagram illustrating a hardware configuration of control units and input/output units of the control system according to the first embodiment.

FIG. 6 is a diagram illustrating a hardware configuration of the control units and the input/output units of the control system according to the first embodiment. The control units 5 and the input/output units 4 of the control system 1 include, as illustrated in FIG. 6, micro-processing units (MPUs) 91 that store computer programs, shared memories 92 capable of storing information, communication circuits 93 capable of communicating with other units, and communication interfaces 94 connected to the network N. The communication circuits 93 are connected to communication interfaces 94. The MPU 91, the shared memory 92, and the communication circuit 93 are connected to one another via an internal bus B9.

The control units 5 and the input/output units 4 include, as illustrated in FIG. 6, input/output interfaces 95 and converters 96 each connected to a corresponding one of the input/output interfaces 95. Input/output interfaces 95D and 95W of the control units 5D and 5W are connected to each other via the tracking cable 7. An input/output interface 95I of the input/output unit 4I is connected to the device 2. An input/output interface 95O of the input/output unit 4O is connected to the device 3.

Functions of the secure applications 11, the determination layers 15, the secure communication layers 12, the general applications 13, and the network layers 14 are implemented by the MPUs 91 executing stored computer programs. The computer programs are computer programs readable by a computer and are implemented by software, firmware, or a combination of the software and the firmware.

The shared memories 92 include storage regions capable of storing data. The shared memories 92 of the input/output units 4 are accessible to the MPUs 91 of both the control units 5. The shared memories 92 are configured by nonvolatile semiconductor memories or volatile semiconductor memories. As the nonvolatile semiconductor memories or the volatile semiconductor memories, RAMS, ROMs, flash memories, erasable programmable read only memories (EPROMs), or electrically erasable programmable read only memories (EEPROMs) can be used. The shared memories 92 can be configured by at least one of magnetic disks, optical disks, and magnetooptical disks.

The communication information TI including the information DI is written in a shared memory 92I of the input/output unit 4I by an MPU 91I of the input/output unit 4I. A MPU 91D of the one control unit 5D operating as the driving control unit acquires the communication information TI from the shared memory 92I of the input/output unit 4I. The MPU 91D, which acquires the communication information TI, clears a storage region of the shared memory 92I that has so far stored the communication information TI, thereby bringing the shared memory 92I to an empty state in which no information is stored. The MPU 91D of the one control unit 5D operating as the driving control unit writes the acquired communication information TI in a shared memory 92D. The MPU 91D of the one control unit 5D operating as the driving control unit generates the communication information TI including the information CI and writes the generated communication information TI in a shared memory 92O of the input/output unit 4O. A MPU 91O acquires the communication information TI from the shared memory 92O of the input/output unit 4O to thereby clear a storage region of the shared memory 92O that has so far stored the communication information TI. The shared memory 92O thus changes to an empty state in which no information is stored. The MPU 91O of the input/output unit 4O transmits the communication information TI acquired from the shared memory 92O, to the device 3 and controls the operation of the device 3.

The communication circuits 93 are implemented by single circuits, composite circuits, programmed processors, parallel-programmed processors, application specific integrated circuits (ASICs), field-programmable gate arrays (FPGAs), or combinations of two or more of the foregoing.

The converters 96 of the input/output units 4 are implemented by analog/digital (A/D) converters that convert into a digital signal an analog signal of signals which each of the MPUs 91 transmits and receives to and from a corresponding one of the devices 2 and 3, digital/analog (D/A) converters that convert digital signals into analog signals, or digital I/Os (Inputs/o Outputs). The converters 96 of the control units 5 are implemented by the digital I/Os.

Figure 7:
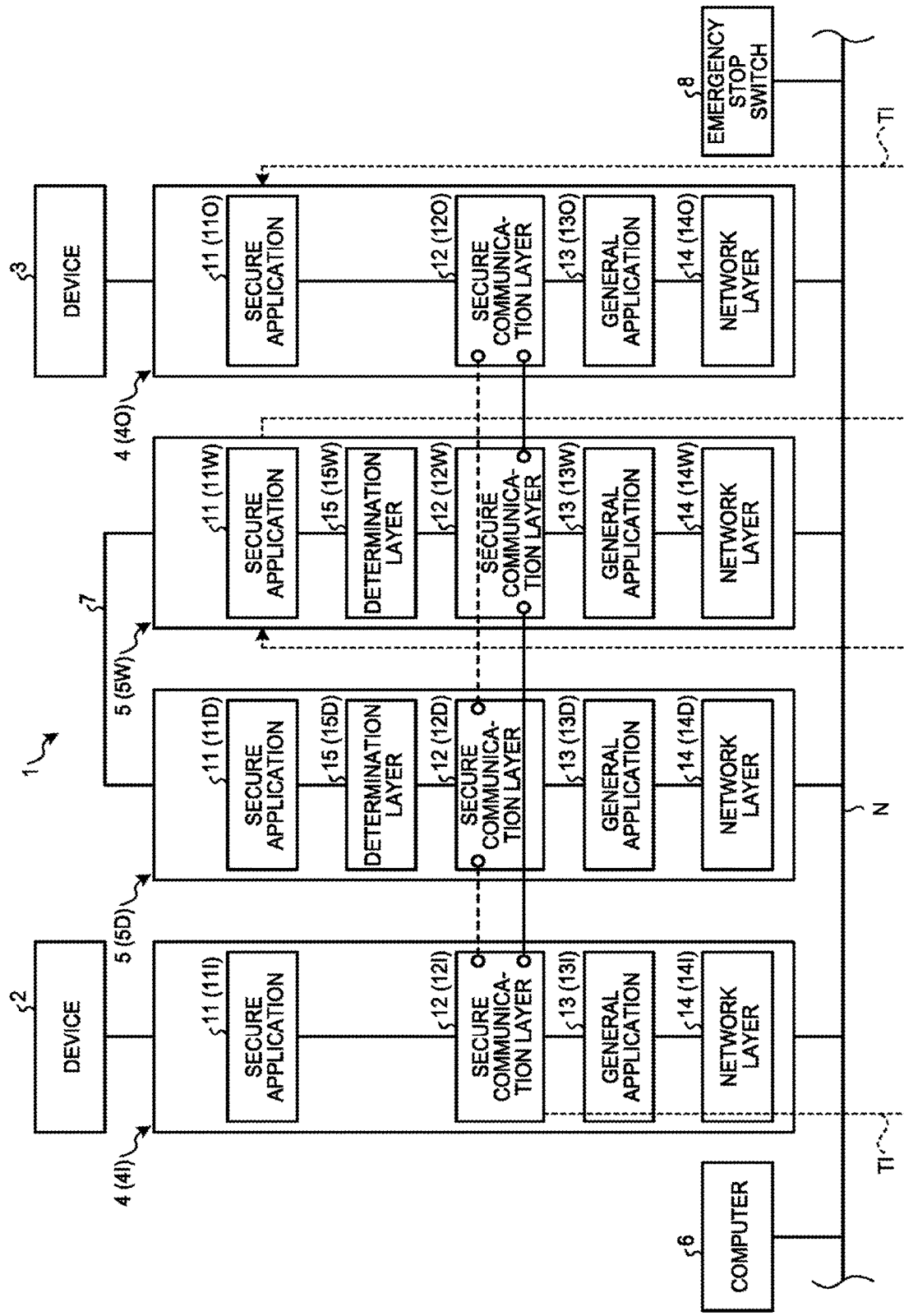
FIG. 7 is a diagram illustrating a state in which a driving control unit of the control system illustrated in FIG. 1 is switched to the other control unit.
Figure 8:
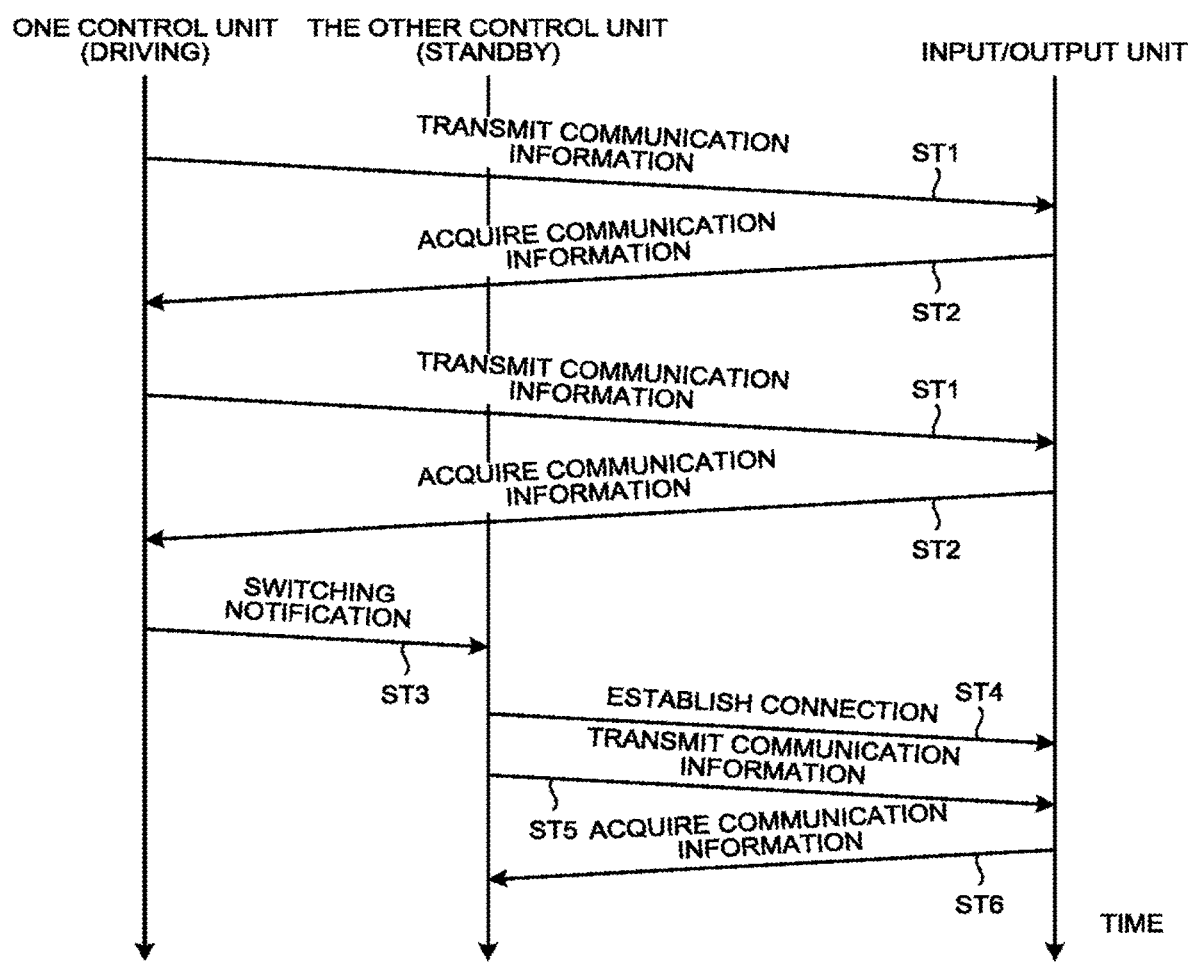
FIG. 8 is a sequence chart illustrating a process for switching the driving control unit when a switching event of the control system illustrated in FIG. 1 occurs.
Figure 9:
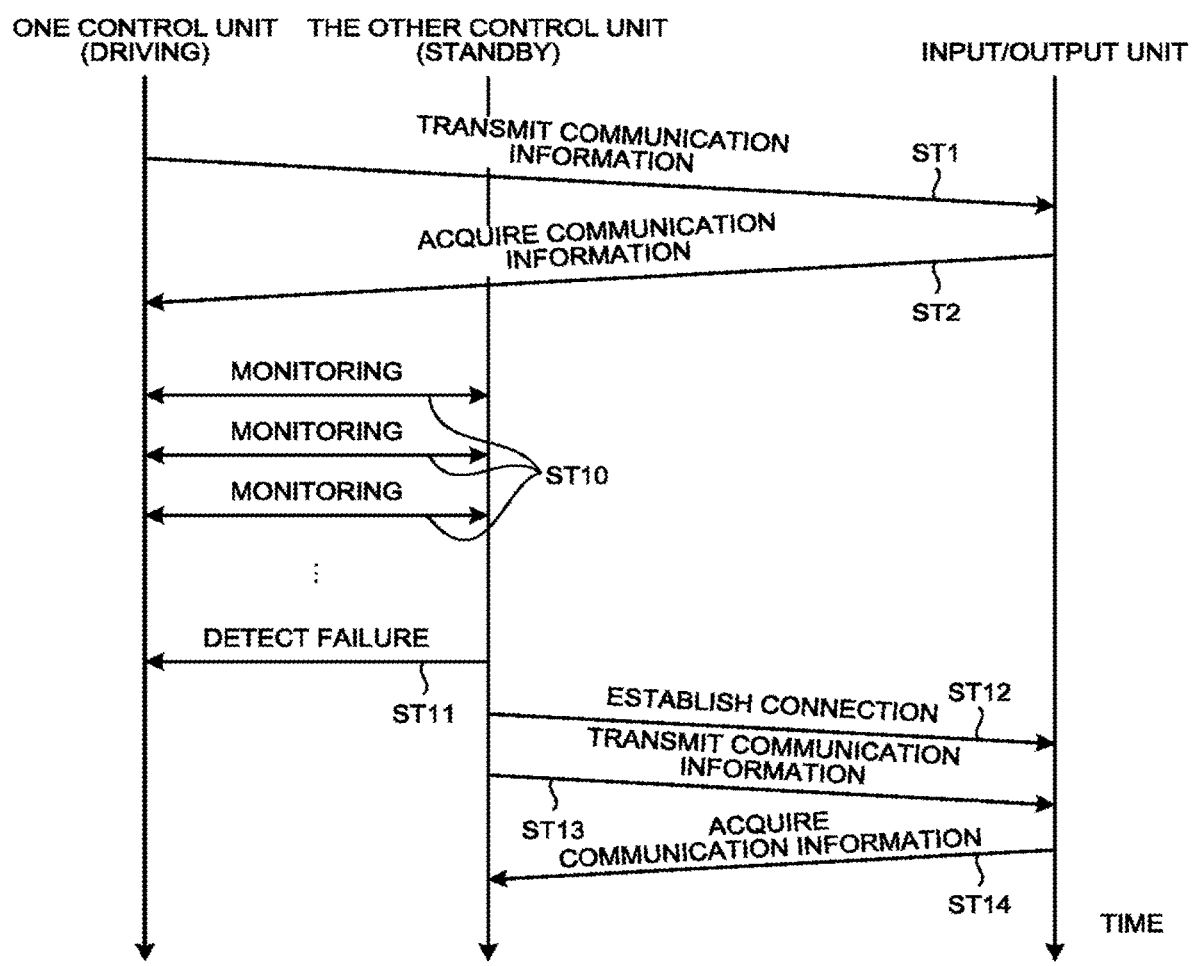
FIG. 9 is a sequence chart illustrating a process for switching the driving control unit when one control unit of the control system illustrated in FIG. 1 breaks down.

A process through which the driving control unit of the control system according to the first embodiment is switched from the first control unit to the second control unit is explained with reference to the drawings. FIG. 7 is a diagram illustrating a state in which the driving control unit of the control system illustrated in FIG. 1 is switched to the other control unit. FIG. 8 is a sequence chart illustrating a process for switching the driving control unit when a switching event of the control system illustrated in FIG. 1 occurs. FIG. 9 is a sequence chart illustrating a process for switching the driving control unit when one control unit of the control system illustrated in FIG. 1 breaks down.

As indicated by solid lines in FIG. 1, the control system 1 establishes connection between the secure communication layer 12D of the one control unit 5D operating as the driving control unit and secure communication layers 12I and 12O of the input/output units 4I and 4O. As indicated by a dotted line illustrated in FIG. 1 and as illustrated in FIG. 8 and FIG. 9, the one control unit 5D transmits the communication information TI to the input/output unit 4O connected to the device 3 and writes the communication information TI in the shared memory 92O of the input/output unit 4O (step ST1). Further, as indicated by a dotted line illustrated in FIG. 1 and as illustrated in FIG. 8 and FIG. 9, the one control unit 5D acquires the communication information TI from the input/output unit 4I connected to the device 2 (step ST2).

In the control system 1, the one control unit 5D receives from the computer 6 a signal indicating a switching request, and generates a switching event. In the control system 1, as illustrated in FIG. 8, when receiving the switching request, the one control unit 5D transmits a switching notification to the other control unit 5W (step ST3). Then, the one control unit 5D breaks the connection to the input/output units 4I and 4O. As illustrated in FIG. 8, the other control unit 5W establishes connection to the input/output units 4I and 4O (step ST4).

As indicated by solid lines in FIG. 7, the control system 1 establishes connection between the secure communication layer 12W of the other control unit 5W and the secure communication layers 12I and 12O of the input/output units 4I and 4O. As indicated by a dotted line illustrated in FIG. 7 and as illustrated in FIG. 8, the other control unit 5W transmits the communication information TI to the input/output unit 4O connected to the device 3 and writes the communication information TI in the shared memory 92O of the input/output unit 4O (step ST5). Further, as indicated by a dotted line illustrated in FIG. 7 and as illustrated in FIG. 8, the other control unit 5W acquires the communication information TI from the input/output unit 4I connected to the device 2 (step ST6).

In the control system 1, the one control unit 5D is transmitting and receiving the communication information TI, that is, the secure communication layer 12D of the one control unit 5D and the secure communication layers 12I and 12O of the input/output units 4I and 4O are establishing the connection, while, as illustrated in FIG. 9, the two control units 5 are monitoring each other via the tracking cable 7 (step ST10). In the control system 1, when the other control unit 5W detects a failure of the one control unit 5D (step ST11), as illustrated in FIG. 9, the other control unit 5W establishes connection to the input/output units 4I and 4O (step ST12).

In the control system 1, when the other control unit 5W establishes the connection, as illustrated in FIG. 9, the other control unit 5W transmits the communication information TI to the input/output unit 4O connected to the device 3 and writes the communication information in the shared memory 92O of the input/output unit 4O (step ST13). Further, as illustrated in FIG. 9, the other control unit 5W acquires the communication information TI from the input/output unit 4I connected to the device 2 (step ST14).

In the control system 1 according to the first embodiment, the other control unit 5W that operates as the standby control unit includes the determination layer 15W separate from the secure communication layer 12W, the determination layer 15W being the determining means for determining to establish connection to the input/output units 4I and 4O when the one control unit 5D operating as the driving control unit of the two control units 5 is disconnected. Since the control system 1 and the control units 5 include the determination layers 15 in addition to the secure communication layers 12 that establish the connection, the determination layer 15 can be adapted to the secure communication layer 12 that perform secure communication employing various communication control schemes. As a result, the control system 1 and the control units 5 can easily switch the connection of the secure communications employing the various communication control schemes.

In the control system 1 and the control units 5 according to the first embodiment, since the determination layer 15 is located in the higher layer of the communication protocol than the secure communication layer 12, the determination layer 15 can be adapted to the secure communication layer 12 that perform the secure communication employing the various communication control schemes. As a result, the control system 1 can easily switch the connection of the secure communication employing the various communication control schemes.

Second Embodiment

Figure 10:
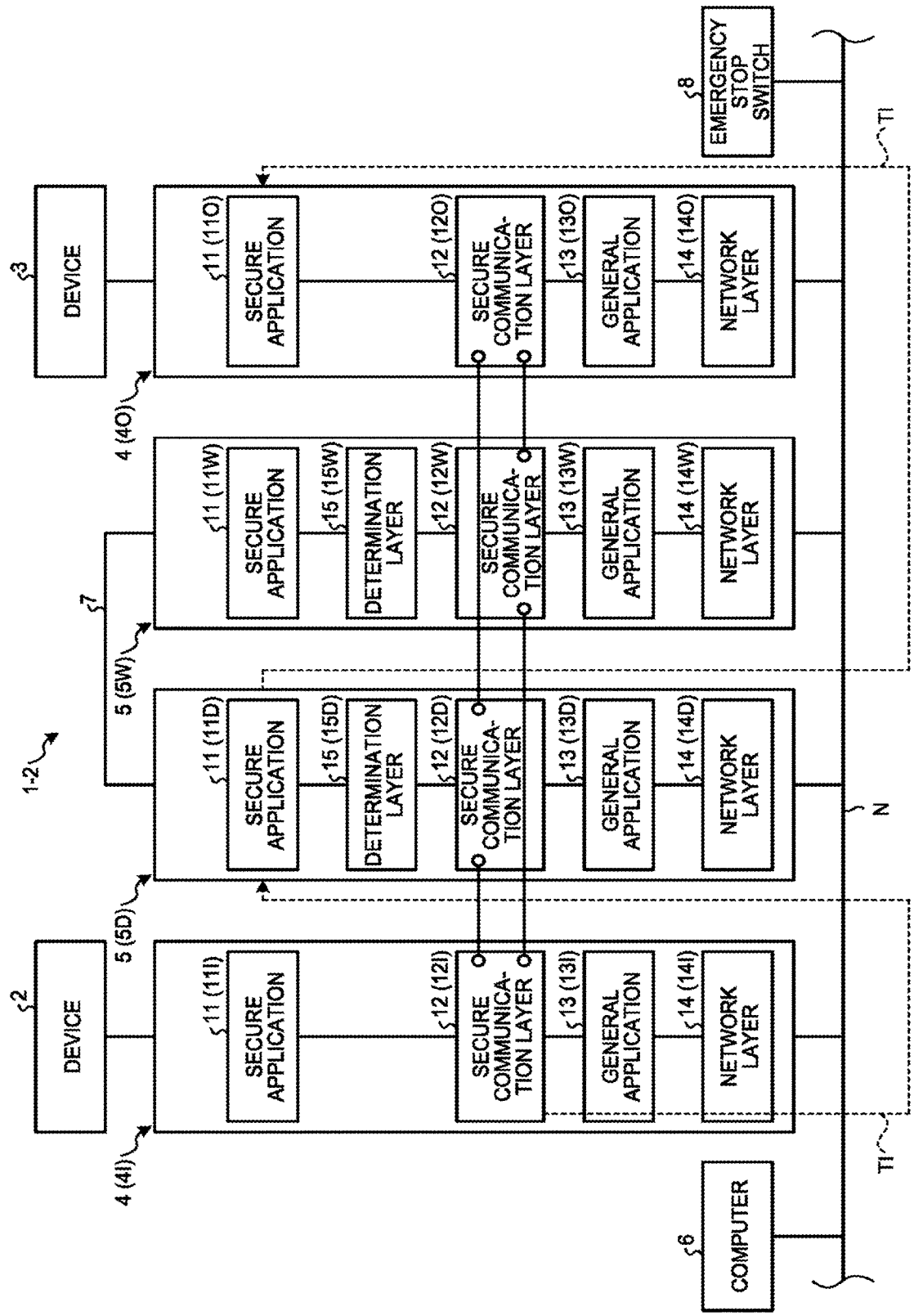
FIG. 10 is a diagram illustrating the configuration of a control system according to a second embodiment.
Figure 11:
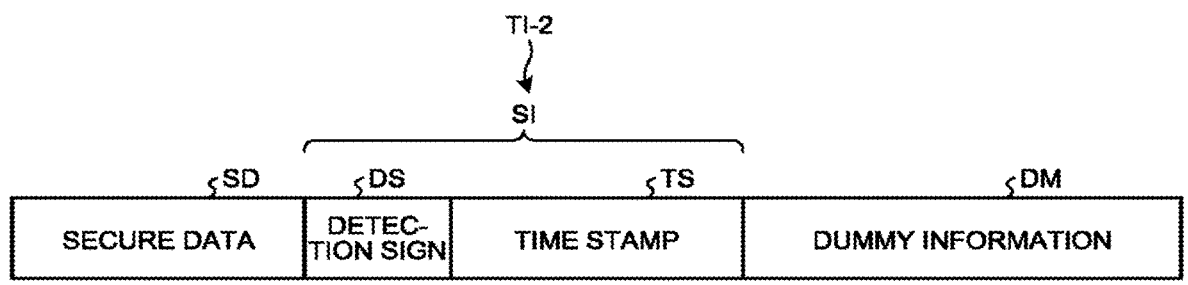
FIG. 11 is a diagram illustrating the configuration of communication information generated by secure applications, secure communication layers, and general applications of the control system according to the second embodiment.
Figure 12:
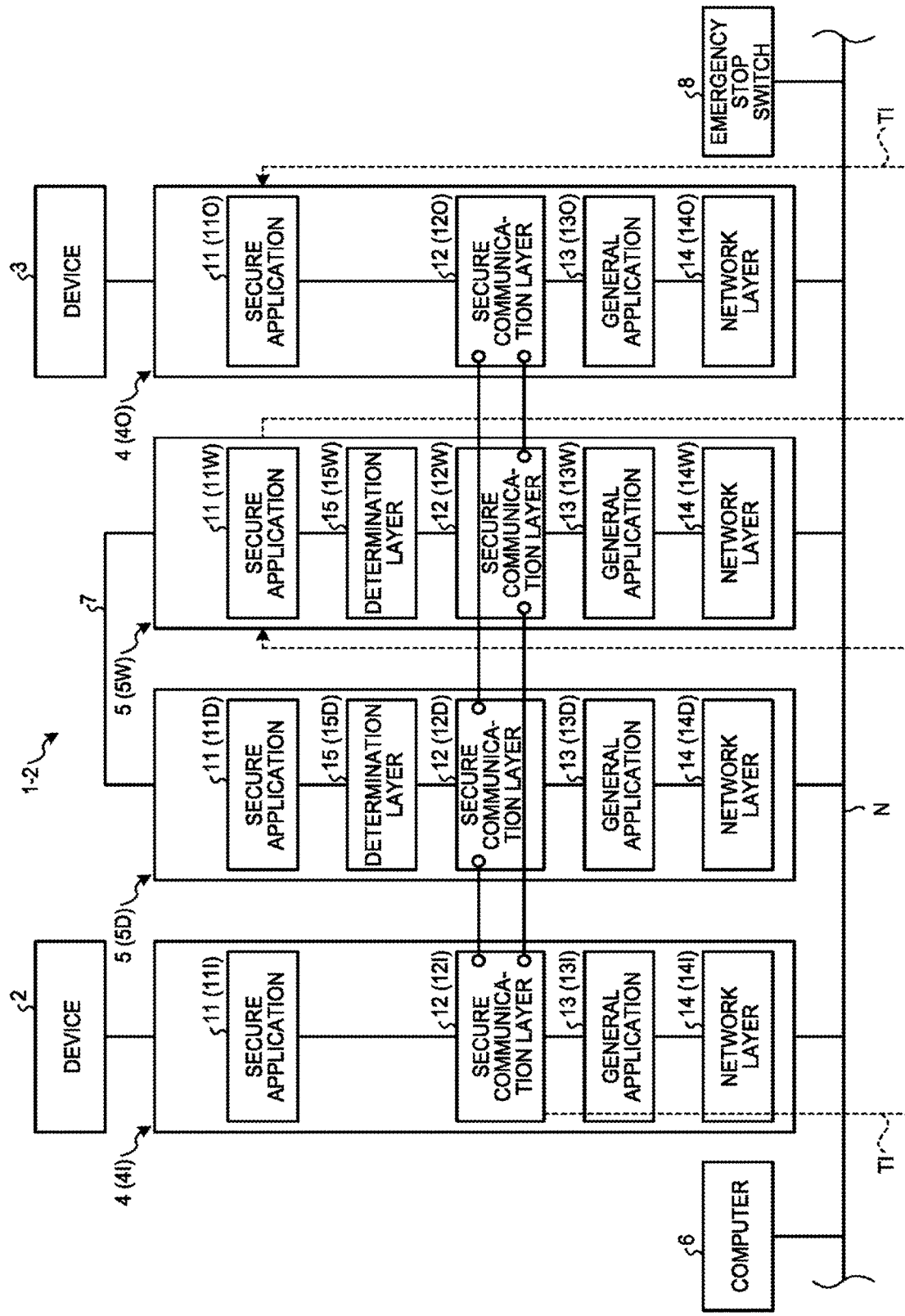
FIG. 12 is a diagram illustrating a state in which a driving control unit of the control system illustrated in FIG. 10 is switched to the other control unit.
Figure 13:
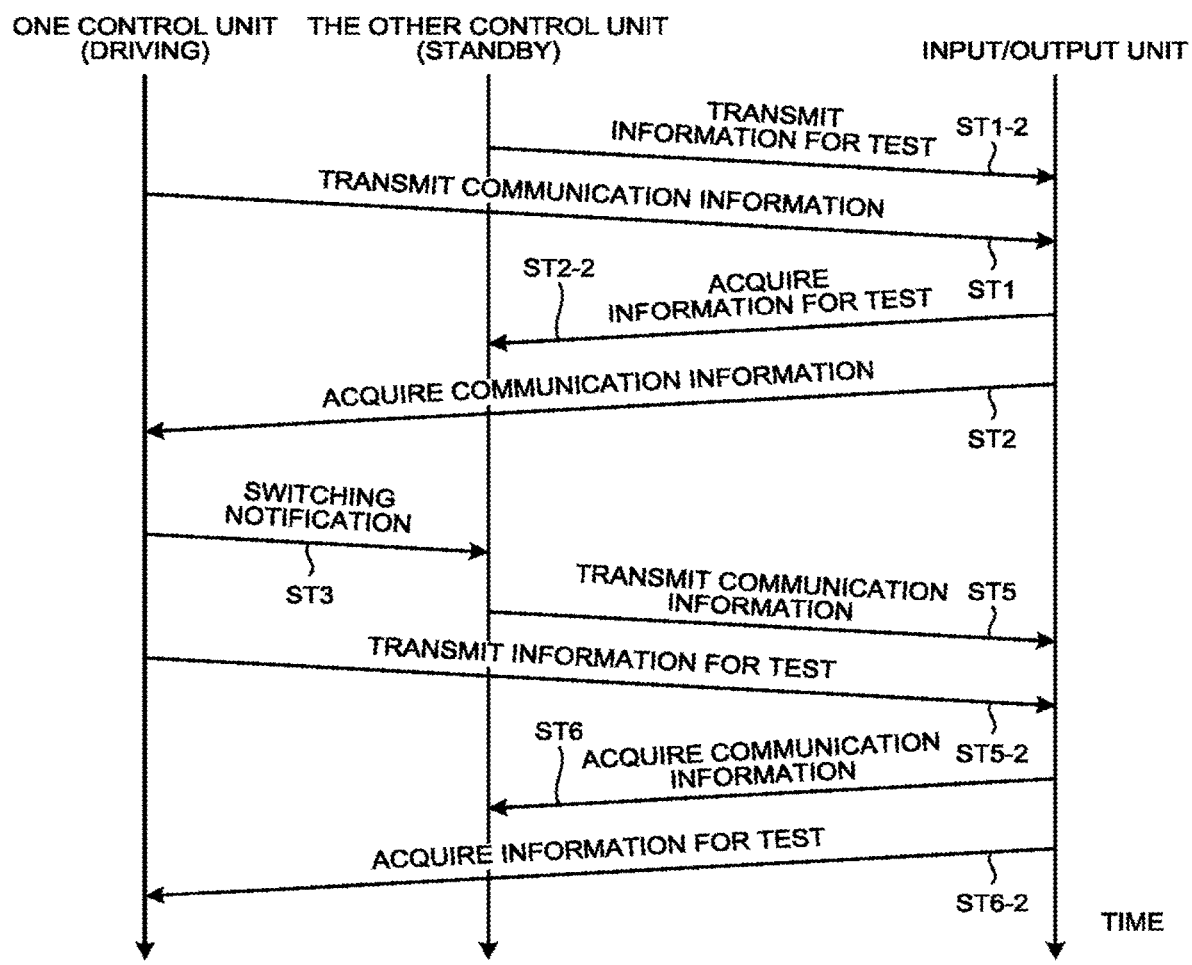
FIG. 13 is a sequence chart illustrating a process for switching the driving control unit when a switching event of the control system illustrated in FIG. 10 occurs.
Figure 14:
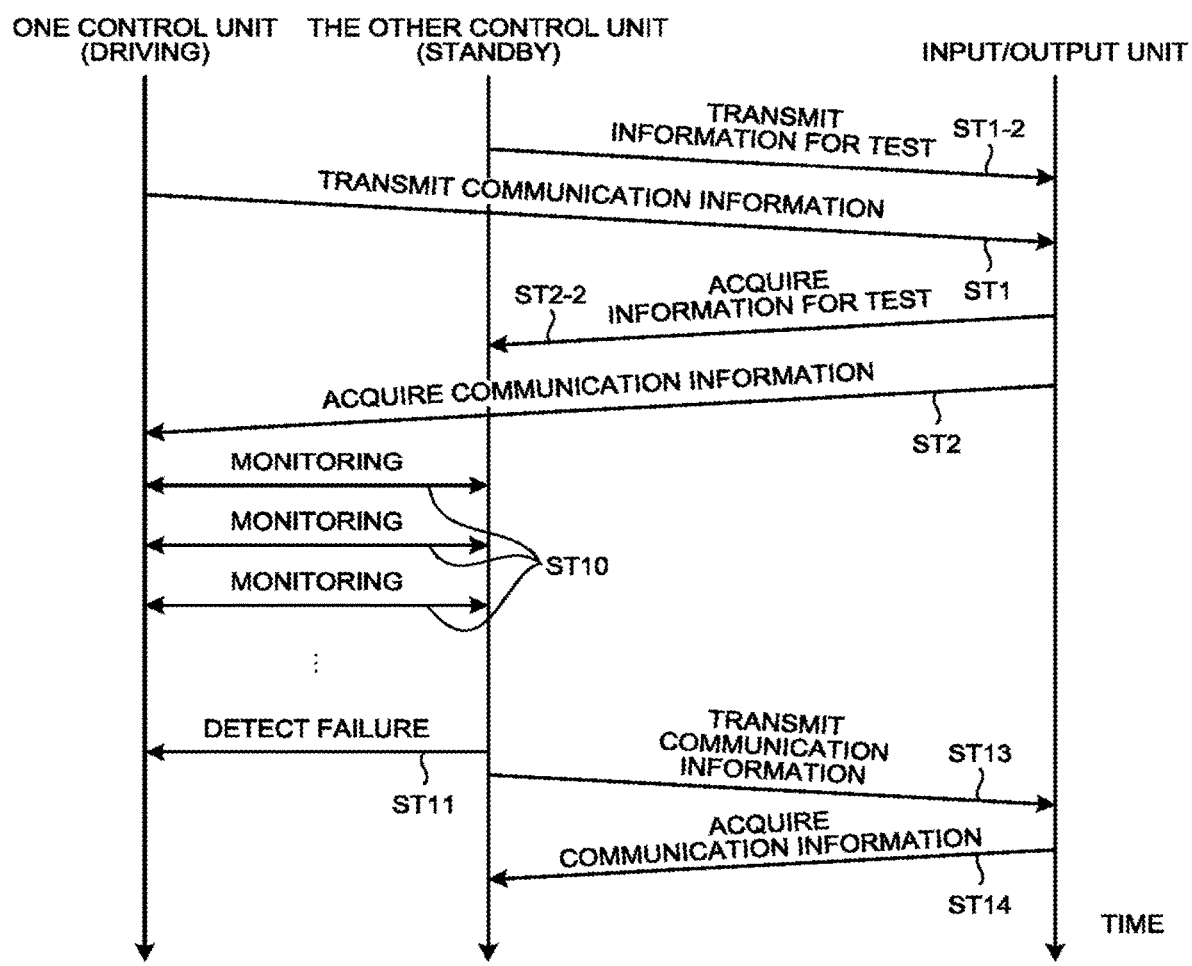
FIG. 14 is a sequence chart illustrating a process for switching the driving control unit when one control unit of the control system illustrated in FIG. 10 breaks down.

A control system 1-2 according to a second embodiment of the present invention is explained with reference to the drawings. FIG. 10 is a diagram illustrating the configuration of the control system according to the second embodiment. FIG. 11 is a diagram illustrating the configuration of communication information generated by secure applications, secure communication layers, and general applications of the control system according to the second embodiment. FIG. 12 is a diagram illustrating a state in which a driving control unit of the control system illustrated in FIG. 10 is switched to the other control unit. FIG. 13 is a sequence chart illustrating a process for switching the driving control unit when a switching event of the control system illustrated in FIG. 10 occurs. FIG. 14 is a sequence chart illustrating a process for switching the driving control unit when one control unit of the control system illustrated in FIG. 10 breaks down. Note that, in FIG. 10 to FIG. 14, the same elements as those in the first embodiment are denoted by the same reference numerals and signs, and explanation of these elements is omitted.

The control system 1-2 according to the second embodiment has the same configuration as the configuration of the control system 1 according to the first embodiment. In the control system 1-2 according to the second embodiment, as indicated by solid lines in FIG. 10, the secure communication layer 12D of the one control unit 5D operating as the driving control unit establishes connection to the secure communication layers 12I and 12O of the input/output units 4I and 4O while the secure communication layer 12W of the other control unit 5W operating as the standby control unit establishes connection to the secure communication layers 12I and 12O of the input/output units 4I and 4O. That is, in the control system 1-2, both of the determination layers 15D and 15W determine to establish connection between both of the control units 5D and 5W and the input/output units 4I and 4O. In the control system 1-2, both of the secure communication layers 12D and 12W establish connection between both of the control units 5D and 5W and the input/output units 4I and 4O in accordance with a result of the determination by the determination layers 15D and 15W.

In the control system 1-2 according to the second embodiment, the one control unit 5D operating as the driving control unit acquires the communication information TI from the input/output unit 4I and transmits the communication information TI to the input/output unit 4O. In the control system 1-2 according to the second embodiment, the other control unit 5W operating as the standby control unit acquires information TI-2 for test illustrated in FIG. 11 from the input/output unit 4I, and transmits the information TI-2 for test to the input/output unit 4O. The information TI-2 for test is information for performing secure communication between the other control unit 5W operating as the standby control unit and the input/output units 4I and 4O. In the second embodiment, the information TI-2 for test includes dummy information DM instead of the information DI and CI of the communication information TI according to the first embodiment.

In the control system 1-2, as indicated by a dotted line illustrated in FIG. 10 and as illustrated in FIG. 13 and FIG. 14, the one control unit 5D transmits the communication information TI to the input/output unit 4O, and writes the communication information TI in the shared memory 92O of the input/output unit 4O (step ST1). Further, as indicated by a dotted line illustrated in FIG. 10 and as illustrated in FIG. 13 and FIG. 14, the one control unit 5D acquires the communication information TI from the input/output unit 4I (step ST2).

Further, in the control system 1-2, as illustrated in FIG. 13 and FIG. 14, the other control unit 5W transmits the information TI-2 for test to the input/output unit 4O, and writes the information TI-2 for test in the shared memory 92O of the input/output unit 4O (step ST1-2). Further, as illustrated in FIG. 13 and FIG. 14, the other control unit 5W acquires the information TI-2 for test from the input/output unit 4I (step ST2-2).

In the control system 1-2, the one control unit 5D receives from the computer 6 a signal indicating a switching request, and generates a switching event. In the control system 1-2, when the one control unit 5D receives from the computer 6 the signal indicating the switching request, as illustrated in FIG. 13, the one control unit 5D transmits a switching notification to the other control unit 5W (step ST3). Then, as indicated by a dotted line illustrated in FIG. 12 and as illustrated in FIG. 13, the other control unit 5W transmits the communication information TI to the input/output unit 4O, and writes the communication information TI in the shared memory 92O of the input/output unit 4O (step ST5). Further, as indicated by a dotted line illustrated in FIG. 12 and as illustrated in FIG. 13, the other control unit 5W acquires the communication information TI from the input/output unit 4I (step ST6).

Further, in the control system 1-2, as illustrated in FIG. 13, the one control unit 5D transmits the information TI-2 for test to the input/output unit 4O, and writes the information TI-2 for test in the shared memory 92O of the input/output unit 4O (step ST5-2). Further, as illustrated in FIG. 13, the one control unit 5D acquires the information TI-2 for test from the input/output unit 4I (step ST6-2).

In the control system 1-2, the one control unit 5D is transmitting and receiving the communication information TI and the other control unit 5W is transmitting and receiving the information TI-2 for test while, as illustrated in FIG. 14, the two control units 5 are monitoring each other via the tracking cable 7 (step ST10). In the control system 1-2, the other control unit 5W sometimes detects a failure of the one control unit 5D (step ST11). In the control system 1-2, when the other control unit 5W detects a failure of the one control unit 5D (step ST11), the connection between the one control unit 5D and the input/output units 4I and 4O is broken. In the control system 1-2, as illustrated in FIG. 14, the other control unit 5W transmits the communication information TI to the input/output unit 4O, using connection to the input/output units 4I and 4O, and writes the communication information TI in the shared memory 92O of the input/output unit 4O (step ST13). Further, as illustrated in FIG. 14, the other control unit 5W acquires the communication information TI from the input/output unit 4I, using the connection to the input/output units 4I and 4O (step ST14).

In the control system 1-2 according to the second embodiment, as in the first embodiment, the control system 1-2 includes the determination layers 15 separately from the secure communication layers 12. It is thus possible to easily switch connection of secure communications employing various communication control schemes.

In the control system 1-2 according to the second embodiment, as in the first embodiment, the determination layer 15 is located in the higher layer of a communication protocol than the secure communication layer 12. It is thus possible to easily switch the connection of the secure communication employing the various communication control schemes.

In the control system 1-2 according to the second embodiment, the determination layers 15D and 15W of both of the two control units 5D and 5W determine to establish connection to the input/output units 4I and 4O. The secure communication layers 12D and 12W of both of the two control units 5D and 5W establish connection to the secure communication layers 12I and 12O of the input/output units 4I and 4O. Therefore, the control system 1-2 according to the second embodiment makes it possible to smoothly perform switching from the driving control unit to the standby control unit.

The configurations explained in the embodiments above indicate examples of the content of the present invention. The configurations can be combined with other publicly-known technologies. A part of the configurations can be omitted or changed in a range not departing from the spirit of the present invention.

Reference Signs List 1, 1-2 control system; 2, 3 apparatus; 4, 4I, 4O input/output unit; 5 control unit; 5D one control unit (first control unit); 5W the other control unit (second control unit); 12, 12D, 12W secure communication layer (connecting means); 15, 15D, 15W determination layer (determining means).

The invention claimed is:

1. A control system including a first controller connected to a receiver/transmitter connected to a device to be set in a facility of a process automation or factory automation field and a second controller capable of substituting for the first controller, one controller of the first controller and the second controller establishing connection to the receiver/transmitter, the control system comprising:
processing circuitry configured to implement a communication protocol formed of a stack of layers that include
a determining layer to determine to establish connection between another controller of the first controller and the second controller and the receiver/transmitter when the connection between the one controller and the receiver/transmitter is broken; and
a communication layer to establish the connection between the other controller and the receiver/transmitter in accordance with a result of the determination by the determining layer, and then perform communication, wherein
the determination layer is located in a higher layer of the stack of layers of the communication protocol of the control system than the communication layer.

2. A control system including a first controller connected to a receiver/transmitter connected to a device to be set in a facility of a process automation or factory automation field and a second controller capable of substituting for the first controller, the control system comprising processing circuitry configured to implement a communication protocol formed of a stack of layers that include:
a determining layer to determine to establish connection between both of the first controller and the second controller and the receiver/transmitter; and
a communication layer to establish the connection between both of the first controller and the second controller and the receiver/transmitter in accordance with a result of the determination by the determining layer, and then perform communication, wherein
when the connection between one controller of the first controller and the second controller and the receiver/transmitter is broken, another controller of the first controller and the second controller transmits and receives information using the connection between the other controller and the receiver/transmitter, and
the determination layer is located in a higher layer of the stack of layers of the communication protocol of the control system than the communication layer.

3. A controller to control a receiver/transmitter connected to a device to be set in a facility of a process automation or factory automation field, the controller comprising:
processing circuitry configured to implement a communication protocol formed of a stack of layers that include
a determining layer to determine to establish connection to the receiver/transmitter; and
a communication layer to establish the connection to the receiver/transmitter in accordance with a result of the determination by the determining layer, and then perform communication, wherein
the determination layer is located in a higher layer of the stack of layers of the communication protocol of the controller than the communication layer.

4. The control system according to claim 1, wherein the determination layer is located in a lower layer of the stack of layers of the communication protocol of the control system than an application layer.

5. A control system including a first controller connected to a receiver/transmitter connected to a device to be set in a facility of a process automation or factory automation field and a second controller capable of substituting for the first controller, either the first controller or the second controller establishing connection to the receiver/transmitter, each of the first and second controllers of the control system comprising:
a determining layer to determine to establish connection between a corresponding one of the first controller and the second controller and the receiver/transmitter when the connection between the other controller and the receiver/transmitter is broken; and
a communication layer to establish the connection between the corresponding controller and the receiver/transmitter in accordance with a result of the determination by the determining layer, and then perform communication, wherein
the determination layer is separate from the communication layer and located higher in a communication protocol between each of the controllers and the receiver/transmitter than the communication layer.

* * * * *